April 29, 1941.  B. G. M. MUSELIER  2,240,223
METER FOR LIQUIDS
Filed Oct. 4, 1938  3 Sheets-Sheet 2

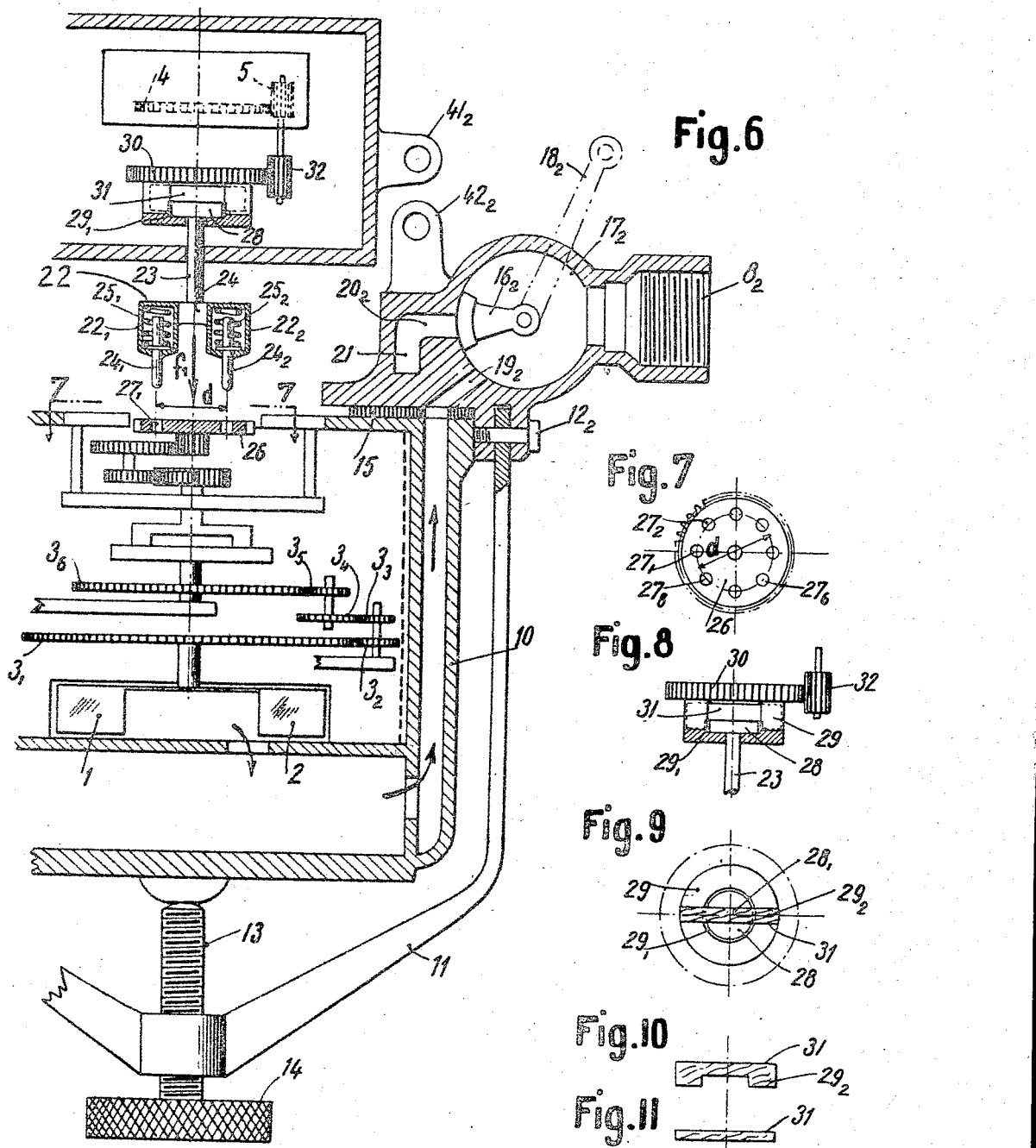

Patented Apr. 29, 1941

2,240,223

UNITED STATES PATENT OFFICE 2,240,223

METER FOR LIQUIDS

Bernard Gabriel Marie Muselier, Paris, France, assignor to Jean Faure Herman, Boulogne-sur-Seine, France Application October 4, 1938, Serial No. 233,145
In France January 11, 1938

4 Claims. (Cl. 73—201)

The present invention has for its object to permit, even in normal service, the continuous inspection and maintenance of meters particularly intended for measuring the fuel used by an airplane engine.

To this end, one of the objects of the invention is to work out a device permitting to completely by-pass the fuel flow outside of the meter when it is necessary to replace the measuring system of said meter, said replacement necessitating no interruption in the engine operation.

The invention also has for its object to work out the automatic coupling between the counter movement and the measuring system governing said movement, whatever be the initial position of the wheels of the measuring system with respect to the counter movement.

The characteristics of the invention will be understood from the following description and from the appended claims.

Figure 1:
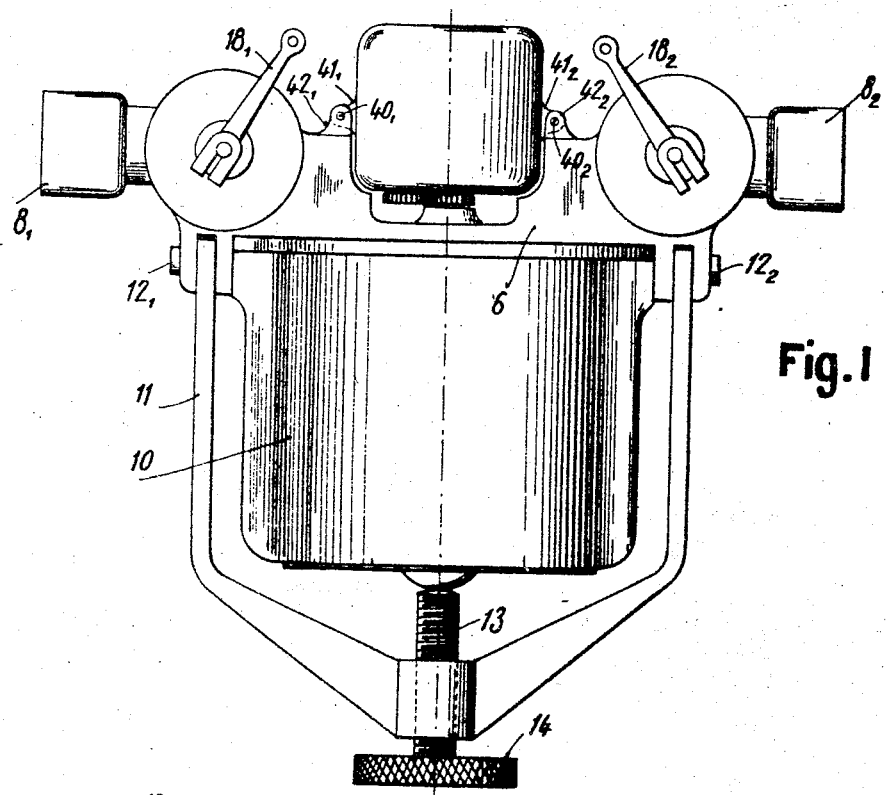
Figure 2:
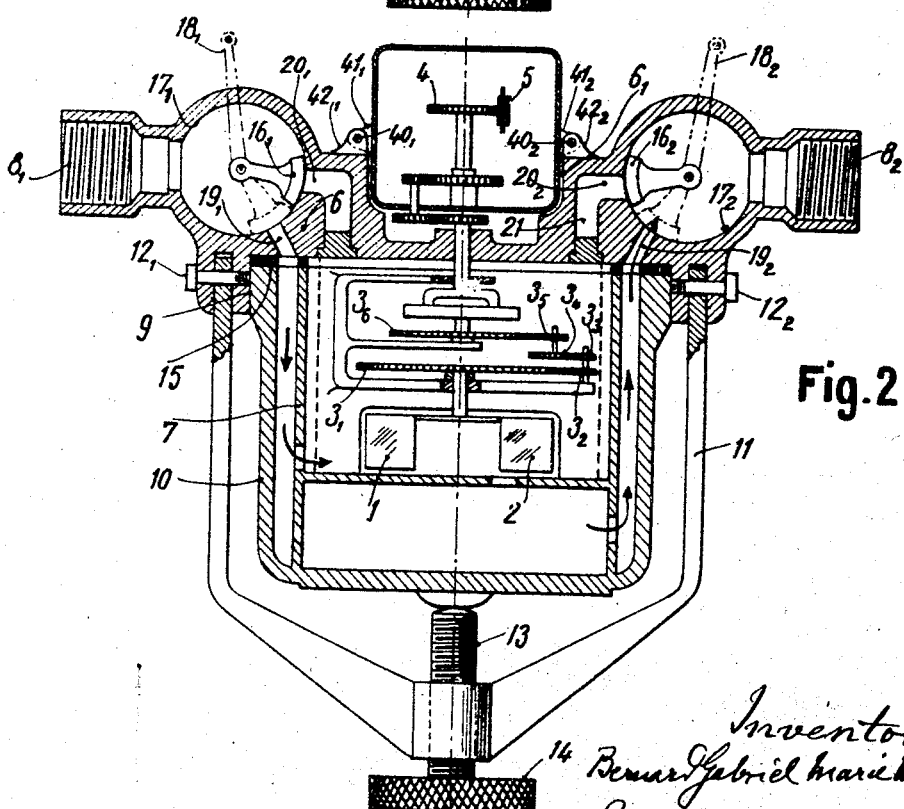
Figure 3:
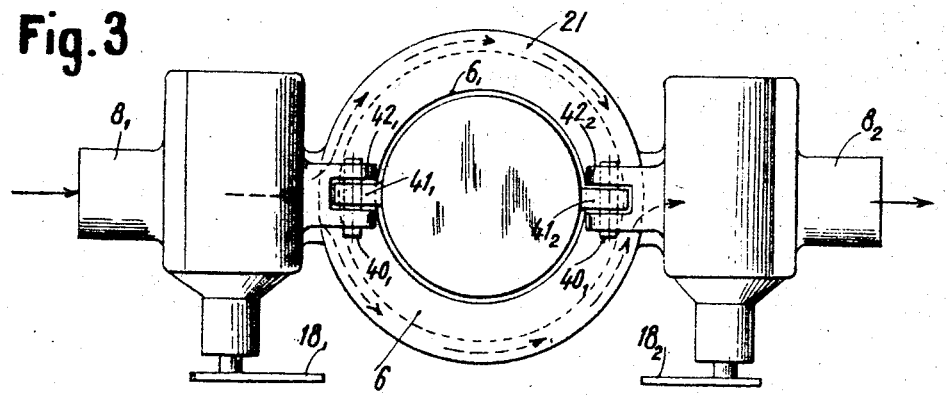
Figure 4:
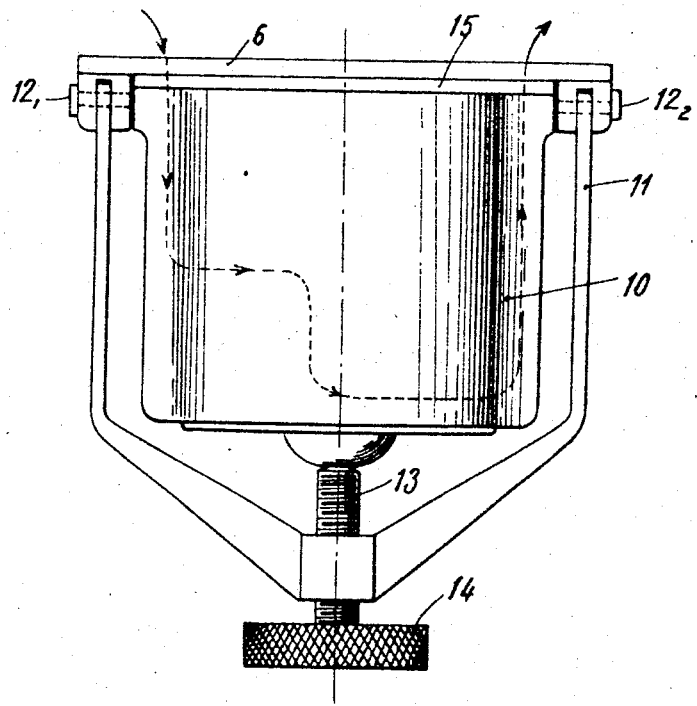
Figure 5:
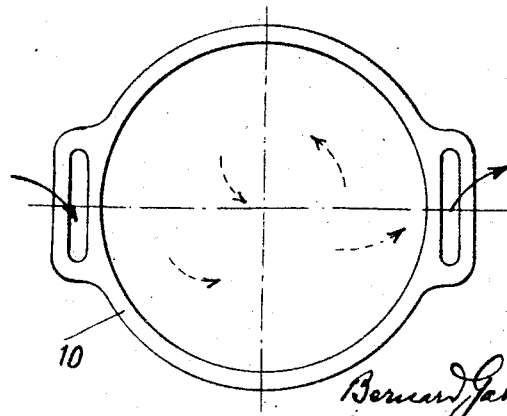

Meters in accordance with the invention are shown by way of example on the enclosed drawings in which:

Figs. 1, 2 and 3 are respectively a front view, an axial cross section view and a plan view of the whole meter, Figs. 4 and 5 are respectively a front view and a plan view of the meter measuring device the internal parts being removed in Fig. 5.

Fig. 6 is a partial axial cross section of another form of meter in accordance with the invention, Fig. 7 is a detail view taken on line 7—7 of Fig. 6, Figs. 8 and 9 are respectively a front and a plan view of a part of the drive between the measuring system and the counter mechanism of the meter of Fig. 6, Figs. 10 and 11 are respectively a front view and a plan view of the driving element shown in Figs. 8 and 9.

The meter (Figs. 1 to 5) intended to be preferably mounted on the gasolene supply pipe of an airplane engine comprises: a paddle measuring system 1—2 movable under the action of the gasolene flow, with gears $3_{1-2-3}$. A counter mechanism is driven by the measuring system; said mechanism particularly comprises a toothed wheel 4 and a pinion 5. A by-pass device 6 is located above the measuring system. The measuring system and the counter mechanism may be of any type.

The part of the meter formed by the measuring system 1—2—3 and by its screen 7 is mounted so that it can be removed with respect to the by-pass device 6. To this end, the by-pass device is composed of a lid made solid with the gasolene inlet and outlet pipes $8_{1-2}$, said lid having a cylindrical face 9 for attaching the cup 10 of the measuring system.

The attaching of the cup 10 to the by-pass device 6 is obtained by means of a yoke 11 pivoted at $12_{1-2}$ on the measuring system and of a pressure screw 13 having an operating knurled head 14. Said screw presses the measuring system 10 against the by-pass device 6 and thus provides removable connection between the measuring system 10 and said by-pass device 6. A gasket 15 insures a tight fit between said cup 10 and the by-pass device 6 which forms a lid.

The by-pass device 6 comprises two cylindrical valve chambers $17_1$—$17_2$ used as distribution chambers and inside which two sector shaped pivoted gates $16_1$—$16_2$ (Fig. 2) can move smoothly.

Said two gates $16_{1-2}$, which can be operated from outside by means of the levers $18_{1-2}$, control the orifices $19_{1-2}$, $20_{1-2}$.

The orifices $19_{1-2}$ communicate with the cup 10 containing the measuring system, while the ports $20_1$ and $20_2$ communicate through an annular groove 21 provided inside the thickness of lid 6. Said groove 21 which surrounds the central part $6_1$ of the lid 6 within which the counter mechanism rests, forms, in cooperation with the orifices $20_{1-2}$, the by-pass device, properly so called.

The whole of the distribution chambers $17_1$—$17_2$ and of the corresponding gates $16_1$—$16_2$ thus forms a distribution device which directs the gasolene either into the measuring cup 10 or into the by-pass 21.

The operation is the following:

In normal service, the gates $16_{1-2}$ hold the position shown in full lines on the Fig. 2, so that the orifices $20_{1-2}$ are obstructed, while the orifices $19_{1-2}$ are cleared; the gasolene supplied by the pipe $8_1$ passes through the orifice $19_1$ and flows into the measuring cup 10. Said gasolene then traverses the screen 7 as well as the measuring system 1—2—3, the rotation of which it causes, then it comes out through the orifice $19_2$. The measuring system operates the counter mechanism 4—5, so that the meter performs its normal duty.

In case of failure, such as the plugging up of the screen 7, the gates $16_{1-2}$ are brought in the position shown in dotted lines on Fig. 2 which closes the ports $19_{1-2}$ and clears the ports $20_{1-2}$. The gasolene entering at $8_1$ is then directed by the orifice $20_1$ towards the groove 21 (Figs. 2-3)

which leads said gasolene through the orifice $28_2$ to outlet $8_2$.

The measuring system is thus isolated from the gasolene supply pipe; said measuring system can then be dismantled by unscrewing the screw 13 and tilting the yoke 11 around its trunnions $12_1$—$12_2$; the cup 10 can now be taken out and also all the parts it contains. The obstructed screen 7 is replaced with a spare one; then all parts are reassembled.

Then, the gates $16_{1-2}$ are placed in their initial position (shown in full lines in Fig. 2), which permits the meter to resume its normal duty.

To sum up, the arrangements discussed permit to direct the liquid flow to the rotating meter members 1—2 or in the by-pass 21 at will. Therefore, it is possible to either put the meter in normal operating position, or entirely by-pass the liquid flow through by-pass 21, the operator being then capable, without interrupting the engine operation, to take off the whole measuring system 1—2 and to replace same by a new measuring system.

The counter mechanism 4—5 operated by the measuring system 10 is itself mounted in a removable manner with respect to said measuring system 10 and to the by-pass device 6. Said removable mounting is, for instance, obtained by means of pins $40_1$—$40_2$ which pass through the lugs $41_1$—$41_2$ in the counter mechanism housing and the bosses $42_1$—$42_2$ cast together with the by-pass.

The form of meter shown in Figs. 6 to 11 comprises an automatic coupling device connecting mechanically the measuring system to the counter mechanism.

Said coupling device comprises a fork 22 which is carried by the shaft 23 of the counter mechanism and which has two stems.

Said stems $24_{1-2}$ are mounted slidingly in the cylinders $22_{1-2}$ of said fork 22, the cylinder being connected by element 24.

Springs $25_{1-2}$ inside the cylinders constantly urge the stems $24_{1-2}$ in direction of arrow $f_1$ toward wheel 26.

On the other hand, the measuring system comprises a driving wheel 26 which has orifices $27_{1-8}$ distributed around a circumference having a diameter $(d)$ equal to the separation of the stems $24_{1-2}$. The connection or coupling is carried out as follows:

When the counter mechanism is moved in direction of arrow $f_1$, near the measuring system, the stems $24_{1-2}$ come in contact with the wheel 26 of said measuring system. If the stems $24_{1-2}$ fall each between two orifices $27_{1-8}$ of said wheel 26, the springs $25_{1-2}$ give way and so permit the contact of the counter mechanism over the whole apparatus; when the wheel 26 rotates, the orifices $27_2$ and $27_6$, for example, come in front of the stems $24_{1-2}$. The latter then automatically engage in the said orifices $27_{2-6}$ under the action of their springs.

As the final result, the automatic engagement of the stems $24_{1-2}$ in the driving wheel 26 is insured whatever be the initial position of said wheel 26 with respect to said stems $24_{1-2}$.

Said coupling thus permits the operator to mount without any special precaution the counter mechanism on the measuring system even if the latter is in operation.

A system for limiting the forces acting is interposed between the measuring system and the counter mechanism. Said system is, for instance, composed as follows: the shaft 23 of the fork 22 holds a grooved plate 28, which rotates freely in the space $29_1$ of a grooved plate 29 fixed to the wheel 30 in mesh with the first pinion 32 of the counter mechanism. A wooden key 31 (Figs. 8 to 11) comprised of $28_1$ and end pieces $29_2$ lodged in the grooves of the plates 28—29 insures the driving of said plates one by the other.

In case of an abnormal resisting force, the wooden key 31 gives way and breaks, so that the counter mechanism is no longer driven by the measuring system. Thus, any breakage of the meter essential parts due to abnormal forces is avoided. Thus, a meter having such a device offers an absolute safety in its applications to an airplane engine in eliminating every risk of defective feed.

I claim:

1. In a liquid meter, flow responsive rotatable means, inlet and outlet connections, a pair of two-way distributing valves each comprising an adjustable gate and each having a free port respectively communicating with said inlet and outlet connections and further having a pair of controlled ports which may be opened or closed by said gate, said flow responsive means being connected to a first controlled port of each of said valves, an annular by-pass member provided with a central recess and further provided with a by-pass channel in the annular wall surrounding said recess, said by-pass channel being connected between the second controlled ports of each of said valves, a counter mechanism mounted in said central recess, and coupling means for operatively coupling said flow responsive rotatable means to said counter mechanism.

2. A liquid meter according to claim 1, said coupling means being separable for permitting rapid uncoupling of said flow responsive rotatable means from said counter mechanism.

3. A liquid meter according to claim 1, said coupling means comprising rotatable elements respectively operatively connected to said flow responsive rotatable means and said counter mechanism and further comprising resiliently urged engaging means carried by one of said elements and engageable in the other of said elements.

4. In a liquid meter, a casing having an annular by-pass chamber, inlet and outlet connections on said casing, valve housings between said inlet and outlet connections and said by-pass chamber, said by-pass chamber having ports for establishing communication with said valve housings, and said casing having passages also communicating with the valve chambers, valve elements in the valve housings movable simultaneously to close the ports between the by-pass chamber and the valve housings and to open said passages in the casing, or vice-versa, a cup-like flow chamber detachably fitted to the casing and adapted to establish communication between said passages in the casing when the ports to the by-pass chamber are closed and the passages are uncovered by said valve elements, flow responsive means in said cup-like flow chamber, and counter mechanism surrounded by the by-pass chamber and detachably connected with said casing and adapted to be detachably connected with said flow responsive mechanism.

BERNARD GABRIEL MARIE MUSELIER.